United States Patent Office 2,965,912

Patented Dec. 27, 1960

1

2,965,912

ANTISEPTIC BRUSHES AND OTHER ARTICLES

Sylvan I. Cohen, Flushing, and Martin S. Frant, Ossining, N.Y., and Frank J. Sowa, Cranford, N.J.; said Cohen and said Frant assignors to Gallowhur Chemical Corporation, New York, N.Y., a corporation of New York No Drawing. Filed July 19, 1954, Ser. No. 444,362

3 Claims. (Cl. 15—159)

The present invention relates to antiseptic articles such as nylon, nylon filaments and brushes, particularly toothbrushes having synthetic plastic heads and handles with nylon bristles, and to the production of such antiseptic articles by treating them with solutions of phenyl mercury compounds to provide them with a durable, chemically adherent deposit having outstanding germistatic and germicidal properties, together with great stability and high resistance to leaching.

In our application Ser. No. 443,424, filed July 14, 1954, now Patent No. 2,901,392, we have particularly described and claimed certain solutions of phenyl mercury compounds, the production of such solutions and the results achievable therewith. These solutions are especially formulated for application to various articles, particularly those composed of nylon or having a nylon component such as nylon bristles, and the present invention is directed to the treatment of such articles with those solutions and to the antiseptic articles thereby produced.

In accordance with the invention and as a specific example thereof, nylon in filamentary form suitable for the fabrication of toothbrush and other bristles is passed through a bath of phenyl mercury formate in a continuous manner at such a rate that every portion of the nylon is subjected to the action of the solution for approximately one minute. It is to be understood, however, that the nylon or other article may be subjected to the phenyl mercury formate solution in other ways, as by dipping, spraying or immersion. The processing is carried out at room temperature, no special conditions being required, and after the nylon has had the indicated length of contact with the solution it is then dried under mild or gentle drying conditions as by means of warm air currents or low temperature drying ovens, except that where time permits the treated article may be allowed to dry in the air under ambient temperature conditions. It is preferred to subject the nylon or other article to the action of the solution for a period of about one minute, but the precise time factor in any given instance depends somewhat upon the nature of the article and its physical configurations and size and, in general, we have found that treatment with the solution from about ten to sixty seconds is adequate. Treatments up to one hour or more are permissible without adversely affecting the results, although prolonged treatment is unnecessary.

The bath or solution through which the nylon or other article is passed or in which it is dipped or immersed is essentially composed of phenyl mercury formate in formic acid, the amount of formic acid being sufficient to provide free formic acid in the final solution and to reduce the content of equivalent mercury of the solution to approximately 1%. Formic acid of 85% strength is used. The equivalent of mercury may, however, range from approximately 0.25 to 5% but for best and most economical results approximately 1% of mercury is preferable. Instead of employing phenyl mercury formate, we may utilize any phenyl mercury compound which, with formic acid, forms phenyl mercury formate.

2

Such a phenyl mercury compound is phenyl mercury hydroxide. The composition of the solutions and the preparation of such solutions are set forth in our aforesaid application, to which reference is hereby made.

In processing nylon and other articles with the aforementioned solutions, it is unnecessary to resort to any special conditions as it is sufficient to effect contact between the article and phenyl mercury formate solution at ordinary prevailing room temperatures, so long as that contact is of adequate duration, as above explained. Phenyl mercury formate in formic acid provides a solution of excellent stability so that the need for precaution, as in the case of phenyl mercury lactate in lactic and formic acids, does not arise. It is, however, neither necessary nor desirable to raise the temperature of the solution during processing of the articles, although warming of the solution is unobjectionable, and may serve to expedite the treatment where the article is large or dense.

The nylon or other article or material may be processed in accordance with the invention at any convenient stage in the manufacture or fabrication of such article or material. Thus, nylon in sheet, filamentary or other physical form or shape may be treated and the antiseptic nylon thus produced may be subsequently finished and incorporated or formed into the final articles. The invention is particularly adapted for the treatment of toothbrushes having synthetic plastic heads and handles with nylon bristles, although other materials may be satisfactorily rendered antiseptic, such as Siberian pig bristles and those plastics and materials which are commonly employed in the manufacture of brushes and other articles.

Articles treated with the solutions above referred to and then dried under mild drying conditions are found to be provided with a chemically adherent, integrated deposit of a phenyl mercury compound. This chemically adherent deposit is characterized not only by excellent germistatic and germicidal activity but by resistance to leaching in the presence of water and dentifrices or detergents. The chemical adherence is so strong and tenacious that it persists for the useful life of the article itself. This treatment produces a combined physical and chemical action in and on the articles which provides the new and outstanding properties described. While the nature of the action is not fully understood and while we do not intend to be bound by any theory with respect thereto, it appears that in nylon, for example, there is both a physical and a chemical interaction with and modification of the polymeric chain and a penetration and diffusion of the chemicals and that the same or analogous action occurs with other synthetic plastic materials without, however, altering the nature or appearance thereof. In the case of nylon bristles of toothbrushes, tests have shown that, after treatment, such bristles contain the equivalent of approximately 0.15–0.030% mercury, which, even under accelerated leaching test conditions, is reduced by only about 0.001% per day, so that, under the normal or usual conditions of use, the chemically adherent deposit lasts throughout the useful life of the article. For further details reference is made to our aforesaid application.

As will be understood from that application, the formic acid plays a vital role in the effective treatment of nylon articles, toothbrushes and other brushes and articles with the new solutions. In the absence of the formic acid, the results of the invention cannot be obtained. The pertinent data with regard thereto has been set forth in the table of our said application. The formic acid, therefore, contributes durability and resistance to leaching and acts as a valuable agent for applying the phenyl mercury formate and, in conjunction with phenyl mercury formate or a phenyl mercury compound which, with formic acid, forms phenyl mercury formate, produces outstanding results markedly superior to any other phenyl mercury compound or solution formulation.

For effective results, a phenyl mercury compound must be used which is of a selective character in that all phenyl mercury compounds do not produce the desired results. This was found to be true, for example, with phenyl mercury linoleate. Therefore, the solution must contain phenyl mercury formate or a phenyl mercury compound such as the hydroxide which, with formic acid, forms phenyl mercury formate and, in addition, formic acid must be present in an amount sufficient to provide some free formic acid in the solution and also to bring the equivalent of mercury to the desired value in the range of 0.25 to 5%, a 1% equivalent of mercury having been found to be best.

Antiseptic articles produced in accordance with the invention are antiseptic or bacteriostatic by the standards of the Food and Drug Administration Circular 198 Method for bristles measuring 0.5 mm. in thickness and 8.0 mms. in length. The inhibitory zone should be at least 6.5 x 8.0 mms. if the bristles are severed to the above length for testing after treatment. Nylon bristles rendered antiseptic in accordance with the invention meet this requirement and furthermore exhibited sufficient bacteriostasis and resistance to further loss of activity even after prolonged brushing tests of 300–390 minutes.

The term "nylon" is used herein in the same sense as in our aforesaid application. The invention is applicable, however, to other synthetic plastics and materials, such as butyrate resin and the plastics and materials commonly employed for toothbrush heads and handles and for other brushes and articles. Treatment of such articles in accordance with the invention does not dissolve, alter or otherwise undesirably attack such materials and does not reduce their useful life. It is to be further noted that the treated bristles or other articles show bactericidal killing action and, consequently, the invention produces results beyond bacteriostasis. The tests for bactericidal activity were made in accordance with those set forth in our aforesaid application which show that, where contact occurred from 1–7 hours, most of the subcultures (in the proportion of two out of three) failed to grow, indicating that most of the organisms (*Bacillus subtilis* and *Micrococcus pyogenes* var. *aureus*), had been killed and that where contact occurred for about 24 or more hours during the tests all subcultures failed to grow.

We claim:

1. Plastic articles provided with a durable, chemically adherent, leach-resistant, antiseptic deposit of phenyl mercury formate.

2. Plastic articles according to claim 1, which are at least partially composed of nylon bristles.

3. A toothbrush with a plastic head and handle and nylon bristles, the said bristles being provided with a durable, chemically adherent, leach-resistant, antiseptic deposit of phenyl mercury formate in an amount sufficient to provide said bristles with an amount of the phenylmercury compound furnishing the equivalent of about 0.15–0.030% mercury.

References Cited in the file of this patent

UNITED STATES PATENTS

| | | |
|---|---|---|
| 2,099,888 | Hill | Nov. 23, 1937 |
| 2,411,815 | Sowa | Nov. 26, 1946 |
| 2,423,261 | Sowa | July 1, 1947 |
| 2,423,262 | Sowa | July 1, 1947 |
| 2,479,275 | Sowa | Aug. 16, 1949 |
| 2,507,299 | D'Alelio | May 9, 1950 |
| 2,637,677 | Dinerstein | May 5, 1953 |
| 2,754,241 | Schwerdle | July 10, 1956 |

FOREIGN PATENTS

| | | |
|---|---|---|
| 543,291 | Great Britain | Feb. 18, 1942 |

OTHER REFERENCES

Rayon and Synthetic Textiles, May 1950, vol. 31, No. 5, page 91.

Textile Colorist, February 1940, page 92.